United States Patent
Shea et al.

[11] 3,766,805
[45] Oct. 23, 1973

[54] SPEED CHANGING TRANSMISSIONS

[75] Inventors: Dennis W. Shea, Toledo, Ohio;
William C. Stoneman, Temperance, Mich.

[73] Assignee: Dana Corporation, Toledo, Ohio

[22] Filed: Jan. 24, 1972

[21] Appl. No.: 220,283

[52] U.S. Cl................. 74/768, 74/750 B, 74/763, 192/6 A
[51] Int. Cl................. F16h 57/10, F16h 3/44
[58] Field of Search.................. 74/768, 750 B; 192/6 A

[56] References Cited
UNITED STATES PATENTS

| | | | |
|---|---|---|---|
| 763,654 | 6/1904 | Baker | 74/768 |
| 2,553,465 | 5/1951 | Monge | 74/768 X |
| 2,717,524 | 9/1955 | Davis | 74/768 X |
| 2,900,848 | 8/1959 | Henn-Collins | 74/768 |
| 2,925,134 | 2/1960 | Cunningham, Jr. | 74/768 X |
| 3,417,639 | 12/1968 | Johnson et al. | 74/768 X |

*Primary Examiner*—Arthur T. McKeon
*Attorney*—Harold D. Shall et al.

[57] ABSTRACT

A three-speed transmission of the planetary type having three sets of planet gears, three sun gears and three ring gears. All planet gears are mounted on and driven by one common carrier which is connected to the input shaft. The sun gears are carried by an output shaft which is rotatably mounted on the input shaft and which extends from the transmission housing to carry a driving sprocket. A shifting mechanism, including a plurality of spring-loaded shifting pawls engageable with the ring gears and operable by a slotted shifting shaft, is selectable to maintain a desired one of the ring gears stationary relative to the housing to provide the desired speed ratio between the input and output shafts. The shifting mechanism in one embodiment also includes a mechanism which engages the first speed ring gear whenever the transmission input is driven in reverse and in another embodiment also includes a mechanism which engages one of the ring gears whenever the shifting pawls are all in their neutral position and the transmission input is driven in the forward direction. The transmission is shown adapted for use as a bicycle drive and mounted such that the transmission housing is fixed against rotation relative to the bicycle frame; the pedal crank being the input shaft to the transmission and extending completely through the same and being rotatably mounted in the bicycle housing with the sun gear driven output shaft rotatably mounted on the input shaft.

28 Claims, 15 Drawing Figures

PATENTED OCT 23 1973 3,766,805

SPEED CHANGING TRANSMISSIONS

SUMMARY OF THE INVENTION

This invention relates to planetary transmissions generally and more particularly to such a transmission which can be manufactured inexpensively, is extremely compact and provides extreme ease of shifting and is an improvement of the transmission shown and described in their co-pending United States patent application Ser. No. 139,486, now U.S. Pat. No. 3,727,484 filed May 3, 1971. The transmission is suitable for use in a large number of common and special installations and environments; an ideal application being in two-wheel vehicles such as a bicycle having a conventional coaster-brake type driving wheel.

Bicycles having a plural ratio drive arrangement have become widely accepted and used throughout the world. The most common of these includes a multi-speed drive arrangement in the hub of the driving wheel or between the pedal sprocket and the driving wheel sprocket; however, with such a driving arrangement, separate hand operated caliper brakes, which engage the bicycle wheel adjacent the periphery thereof, are utilized since the space within the wheel hub being operated by the multi-speed drive arrangement, does not also accommodate a braking means of sufficient size to be satisfactorily operable.

The transmission of the present invention is located adjacent to the frame supported pedal crank hub (hereinafter referred to as frame hub) and, therefore, can be utilized to drive the sprocket carried by the driving wheel; the latter being provided with a conventional coaster brake wheel hub.

In the coaster brake wheel hub, rotating the wheel sprocket in the drive direction imparts a forward drive rotation to the wheel. When the sprocket is held stationary, i.e., when the pedals are not actuated, the driving wheel can overrun the wheel sprocket, and when the sprocket is rotated in the reverse direction, braking means associated with the driving wheel hub are energized to brake the wheel rotation and thereby stop movement of the bicycle. The transmission of this invention, when used with the coaster-brake equipped driving wheel provides a plural ratio drive and also allows for pedal actuated braking. Since the coaster-brake hub provides for driving wheel overrunning there is no necessity for a "neutral" condition in the driving transmission of this invention.

The multiple speed transmission of this invention as shown and described has separate planetary gear sets for an underdrive ratio, a normal or conventional ratio (which provides an overall drive ratio between the pedals and the rear wheel equivalent to the ratio encountered with a single speed bicycle), and an overdrive ratio, with each gear set including a ring gear. The transmission shifting mechanism includes a plurality of first spring loaded pawls engageable with the ring gear of the various gear sets to maintain the selected ring gear stationary thereby to engage the selected gear ratio. The shifting mechanism also includes a spring loaded reverse pawl, which, whenever the first pawls are all in their neutral position or whenever the input to the transmission is rotated in the reverse direction, will engage the underdrive ring gear and prevent reverse rotation thereof, thereby to insure not only that reverse rotation can be imparted to the transmission output shaft but also that such reverse rotation of the output shaft is provided at a gear ratio mechanical advantage with respect to the input shaft to insure maximum braking effort. This insures that, if used with a bicycle, the coaster brakes can always be engaged.

In another embodiment of this invention the shifting mechanism is also provided with a spring loaded forward pawl, which, whenever the first pawls are all in their neutral position, will engage one of the ring gears and prevent forward rotation thereof, thereby to insure that when the input to the transmission is driven in the forward direction, a driving connection will always exist between the input and output shaft and, for example, the operator of a bicycle will not be faced with a neutralized transmission.

It is, therefore, an object of this invention to provide a planetary multiple ratio transmission which is compact, easy to shift and inexpensive to manufacture and includes means to insure that a driving connection will always exist between the input and output shafts when the input shaft is rotated in the reverse direction.

Another object of this invention is to provide a multi-speed ratio transmission which can be used to drive a bicycle and can be utilized with a driving wheel having a coaster-brake hub so that multiple ratios can be obtained and pedal braking can be attained even when the shifting mechanism of the transmission is neutralized.

Further and other objects of this invention will become apparent from the following detailed description taken in conjunction with the accompanying drawings wherein:

FIG. 7 is a fragmentary sectional view of the transmission taken along lines 7—7 in FIG. 2;

FIG. 8 is a plan view of the reverse pawl seen in FIGS. 2, 6 and 7;

FIGS. 9 and 10 are views taken similarly to FIG. 6 of another embodiment of this invention; FIG. 9 being in a forward operating phase and FIG. 10 being in a reverse operating phase;

Figure 1:
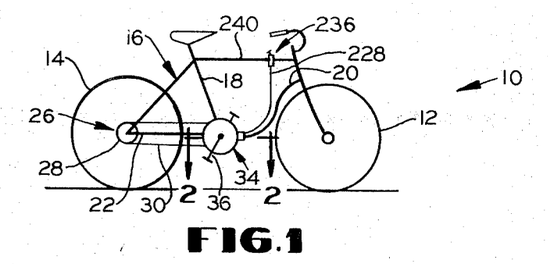
FIG. 1 is a schematic side elevational view of a bicycle incorporating a transmission of this invention.

Referring now to the drawings and more particularly to FIG. 1, a bicycle shown schematically at 10 has a forward wheel 12 and a rear driving wheel 14, mounted on a frame 16. The frame 16 includes a vertically extending seat post element 18, a forwardly extending lower frame element 20 and a pair of rearwardly extending lower frame elements 22; which elements 20 and 22 join to a cylindrical frame hub 24 (the hub being seen in FIG. 2).

The driving wheel 14 has a conventional coaster-brake wheel hub 26 which includes an input sprocket 28 for the driving wheel which is drivingly connected by a chain 30 to a drive sprocket 32 (the sprocket 32 being shown in FIG. 2 and more fully explained hereinafter).

A further object of this invention is to provide a planetary multiple ratio transmission which includes means for insuring that a driving connection always exists between the input and output shafts when the input shaft is rotated in a forward direction.

Yet another object of this invention is to provide a planetary multiple ratio transmission wherein the shifting mechanism for selecting the various ratios is susceptible of being neutralized but which includes means for insuring that at the time of such neutralization a drive connection will still exist between the input and output shafts.

A transmission 34 provides a driving connection between a pedal crank assembly 36 and the sprocket 32. More particularly, the pedal crank assembly 36 includes a left and right pedal crank, 38 and 40 respectively, disposed in a conventional opposed relationship and drivingly secured to the outboard ends of a through or input shaft 42 and by roll pins 44 passing through aligned openings therein. The left half of the shaft 42 is mounted for rotation in the frame hub 24 by a pair of bearings 46 and 47. The bearing 46 has an inner race 48 threaded on the shaft 42, an outer race 50, the inboard end of which is lightly pressed into the bore of a hub 24 with an integral flange 52 of the outer race engaging the left outer end of the hub 24, and a plurality of caged ball bearings 54 disposed between the races. A washer 56 in the form of a dust cap is disposed on the shaft 42 with the right side thereof abutting the inner race 48 and the flanged periphery thereof slightly spaced from and overlapping the end of the hub 24, and a lock nut 58 is threaded on the shaft 42 and abuts the washer 56, thereby to press the latter against the inner race 48. The bearing 47 has an inner race 60 threaded on the shaft 42, an outer race 62 lightly pressed into the bore 24, with an integral flange 64 on the outer race engaging the right outer end of the hub 24, and a plurality of caged ball bearings 66 between the races. A thrust washer 68 abuts the right side of the inner race 60 and also abuts the left side of the sprocket 32, while a lock nut 70 is threaded on the shaft 42 and abuts the left side of the inner race 60.

To remove the shaft 42 from the hub 24, it is only necessary to remove the pedal crank 38, the lock nut 58 and the washer 56; the inner race 48 can then be removed from the shaft 42 and then the shaft 42 carrying the inner race 60 can be withdrawn to the right from the hub 24. Thus, if the pedal crank assembly of a standard single speed bicycle is removed, the transmission 34 of this invention can easily replace the same to convert the standard bicycle to a multi-speed bicycle; however, it should be understood that a housing 72 of the transmission 34 can replace the hub of a standard bicycle, with the frame elements 20, 22 and 18 being attached to the housing 72 and suitable bearings installed in the housing 72 to take the place of the bearings 46 and 47.

The transmission 34 includes a two-piece housing 72 having an annular cavity 74 and a pair of aligned bores 76 and 78 therein; the rightward half of shaft 42 extending through the bores and being rotatable relative thereto. Disposed in the cavity 74 is a planetary gear set shown generally at 79. More particularly, in the peripheral wall of the cavity 74 is an annular slot 80, and three ring gears 82, 84 and 86 have the peripheral portion thereof rotatably received in the slot 80. The gear set 79 also includes a cluster gear 88 comprised of three sun gears 90, 92 and 94 cooperatively disposed with the ring gears 82, 84 and 86 respectively. Drivingly disposed between and meshed with the ring gear 82 and sun gear 90 are a pair of planetary gears 96 (as seen in FIGS. 2 and 3) while between the ring gear 84 and the sun gear 92 are a pair of planet gears 98 and between the ring gear 86 and the sun gear 94 are a pair of planet gears 100.

Figure 2:
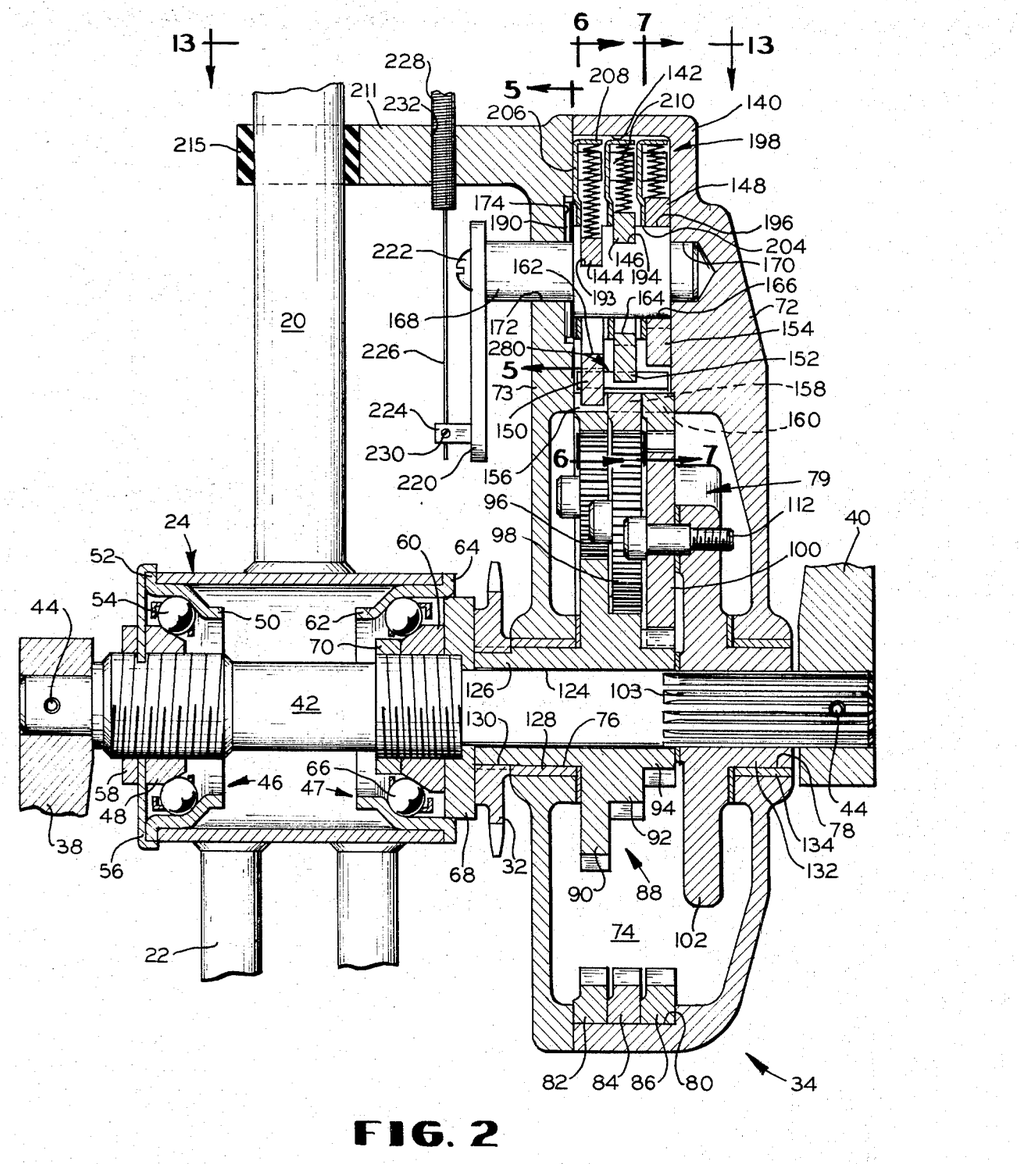
FIG. 2 is a sectional view of a transmission incorporating this invention taken along the lines 2—2 in FIG. 1, with two of the planet gear sets shown out of their normal position for clarity purposes.
Figure 3:
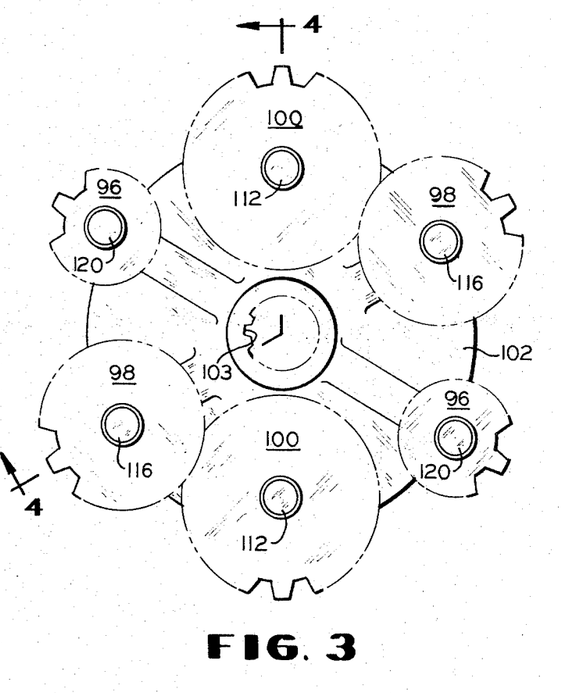
FIG. 3 is an elevational view of the planet gears and planet carrier subassembly when seen as though viewed from the left in FIG. 4 is a sectional view of the planet gears and planet carrier subassembly taken along the lines 4—4 in FIG. 3.

The planet gears are shown in FIG. 2 out of their normal position for illustration purposes, but reference to FIG. 3 reveals that the planet gears 96 are diametrically opposed from each other as are the pair of gears 98 and the pair of gears 100, with each planet gear 96 disposed circumferentially intermediate a planet gear 98 and 100, each planet gear 98 being intermediate a planet gear 96 and 100 and each planet gear 100 being intermediate a planet gear 96 and 98.

Figure 4:
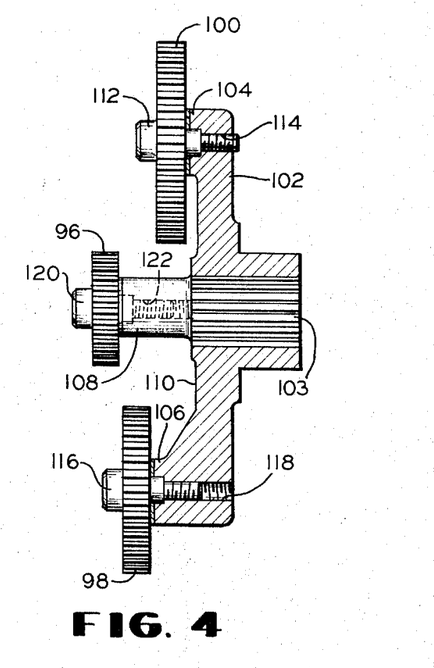

Referring now to FIGS. 3 and 4, the planet gears 96, 98 and 100 are rotatably mounted on a planet carrier 102. The carrier 102 is generally disk shaped with a splined central bore 103 and has three pairs of diametrically opposed bosses 104, 106 and 108. The bosses 104 project slightly to the left of the left face 110 of the carrier 102 and each rotatably mounts one of the pair of planet gears 100 by means of a shouldered bolt 112 passing through a central bore in the gear and threaded into a bore 114 in the bosses 104. The bosses 106 project further to the left than the bosses 104 and each rotatably mounts one of the pair of planet gears 98 by means of a shouldered bolt 116 passing through a central bore in the gear and threaded into a bore 118 in the bosses 106; the bosses 106 projecting to the left sufficiently to align the planet gears 98 with the ring gear 84 as seen in FIG. 2. The bosses 108 project further to the left than the bosses 106 and each rotatably mounts one of the pair of planetary gears 96 by means of a shouldered bolt 120 passing through a central bore in the gear and threaded into a bore 122 in the bosses 108; the bosses 108 projecting to the left sufficiently to align the planet gears 96 with the ring gear 82.

The cluster gear 88 has a bore 124 therein and is rotatably mounted on the shaft 42; a hub 126 of the gear 88 extending to the left from the sun gear 90 and being rotatably mounted in the bore 76 of the housing 72 by a bushing 128. The portion of the hub 126 outwardly of the housing 72 serves as the output from the transmission 34 and has the sprocket 32 mounted thereon for unitary rotation, as by the splined connection shown at 130. The planet carrier 102 is positioned immediately to the right of the cluster gear 88 and is splined for unitary rotation on the shaft 42, with the carrier having a rightwardly extending hub 132 rotatably mounted in the housing bore 78 by a bushing 134.

A particular combination of gear teeth in the various gear ratios and the increased speed ratio obtained thereby is set forth below; such ratio being obtained by maintaining the desired ring gear 82, 84 or 86 stationary relative to the housing 72 while allowing the other ring gears to rotate freely. Ring gear 82 provides the low or first gear ratio, ring gear 84 providing the intermediate or second gear ratio and ring gear 86 providing the high or third gear ratio. It is noted that all the ring gears are identical in size and tooth number, the different ratios being obtained by varying the size and number of teeth of the sun and planet gears.

| Ring gear | | Planet gear | | Sun gear | | |
|---|---|---|---|---|---|---|
| Gear number | Number of teeth | Gear number | Number of teeth | Gear number | Number of teeth | Increased speed ratio |
| 82 | 62 | 96 | 13 | 90 | 36 | 2.72 (1st) |
| 84 | 62 | 98 | 19 | 92 | 24 | 3.58 (2nd) |
| 86 | 62 | 100 | 23 | 94 | 16 | 4.87 (3rd) |

The sprocket 32 utilized with the above gear ratios in several transmissions tested in installations on conventional bicycles had thirteen teeth, while the hub sprocket 28 ranged from eighteen to twenty teeth, with an average of nineteen teeth so that the average speed decrease obtained through the sprockets was 0.68. Thus, with the ring gear 84 selected, the overall ratio increase obtained with the above drive arrangement through the transmission 34 and sprockets 32 and 28, was 2.43, which compares to the "normal" overall drive increase ratio of 2.4 provided by the sprockets of the average single speed bicycle, so that the ring gear 82 provides an underdrive ratio and ring gear 86 provides an overdrive ratio when compared to the "normal" ratio. It should be understood that ratios other than those described above may be provided by varying the number of teeth in the gears and/or sprockets depending on the results desired.

A shiftable means is provided for selecting the desired ring gear and preventing the same from rotating relative to the housing 72. More particularly, and with reference to FIGS. 2, 6, 6A and 7, the housing 72 has a projecting portion 140 having a radially extending generally rectangular bore 142 therein which opens into the slot 80 and receives three shifter pawls 144, 146 and 148; the pawls being movable radially within the bore 142 and being aligned respectively with the ring gears 82, 84 and 86. All the pawls are of identical shape and have an axial width, as seen in FIG. 2, slightly less than the width of the ring gears. As clearly seen in FIG. 6 with reference to pawl 144, when viewed from the axially facing side thereof, the pawls are generally rectangular in shape and in a close sliding fit in the bore 142.

Figure 6:
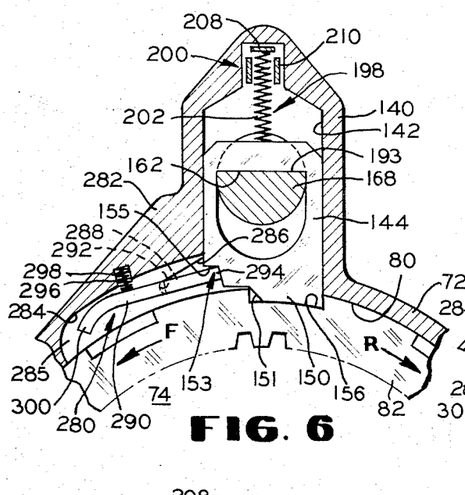
FIG. 6 is a sectional view of the transmission when seen along the lines 6—6 in FIG. 2.
Figure 6A:
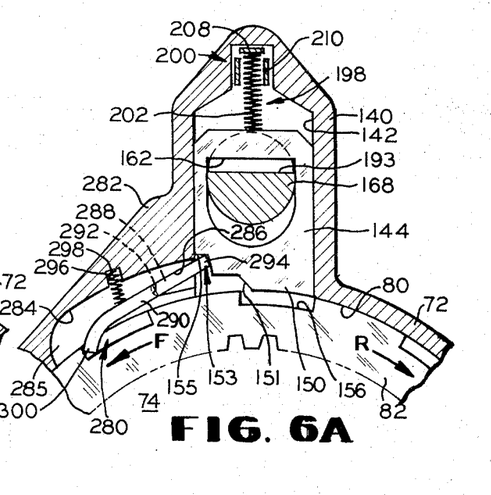
FIG. 6A is a view like FIG. 6 showing the transmission being operated in its reverse phase.
Figures 7, 8, 9:
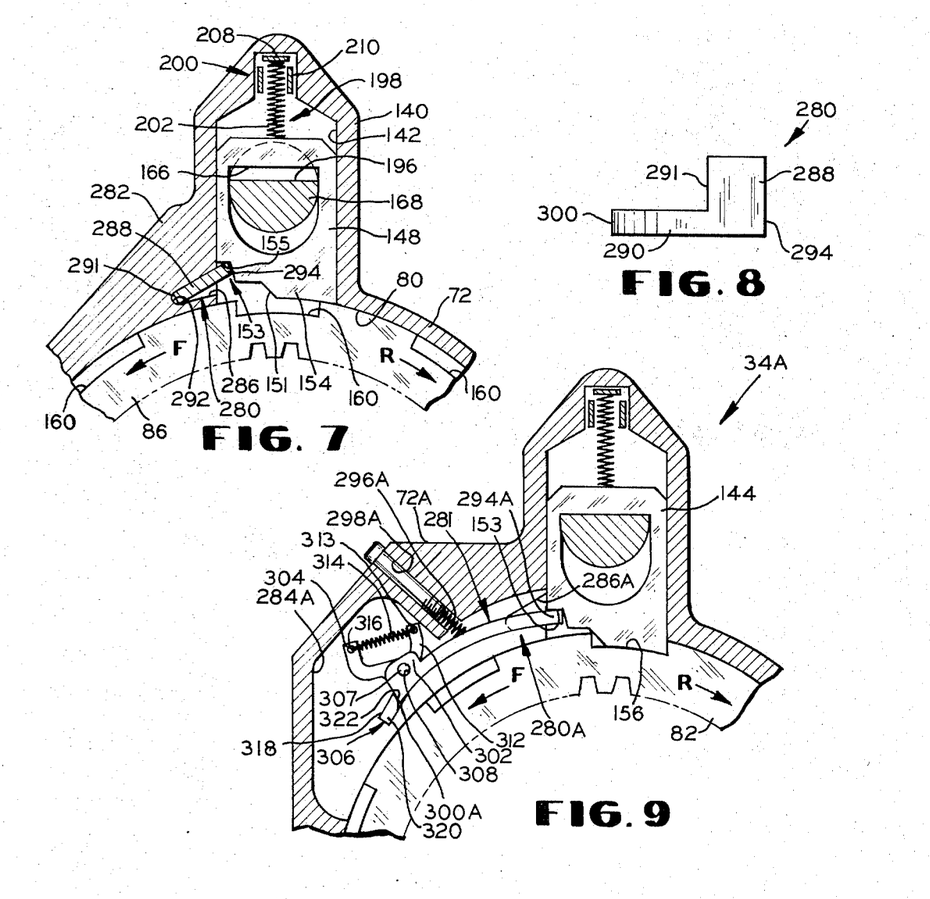

The radially inner end of the pawl 144 has a lug 150 formed thereon, while the pawls 146 and 148, respectively, have lugs 152 and 154 formed thereon. When the pawl 144 is in its radially innermost position, the lug 150 thereon can engage one of a plurality of notches 156 formed in the periphery of the ring gear 82; a similar relationship existing with respect to the lugs 152 and 154 and the notches 158 and 160 in the ring gears 84 and 86, respectively. When the pawls 144, 146 and 148 are radially outwardly, the lugs thereon are spaced radially outwardly from the periphery of the ring gears. As seen in FIGS. 6, 6A and 7, the left side of the lugs 150 angle upwardly to the left to form a cam surface 151. Immediately to the left of the cam 151, a notch 153 is formed in the left side of each of the pawls 144, 146 and 148, the upper walls 155 of the notches 153 facing radially inwardly. While only the notches 153, and cam surfaces 151 are shown on pawls 144 and 148, pawl 146 is identical.

Figure 5:
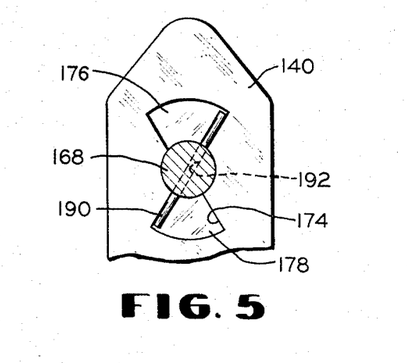
FIG. 5 is a sectional view of the transmission when seen along the lines 5—5 in FIG. 2.

The pawls 144, 146 and 148 respectively, have an opening 162, 164 and 166 extending axially therethrough which openings are elongated in the radial direction and are rounded at the radially inner end thereof. An axially extending shifter shaft 168, disposed parallel to the shaft 42, extends through the pawl openings 162, 164 and 166. The right end of the shaft 168 is rotatably received in a blind bore 170 formed in the housing 72; the bore having a shoulder adjacent the tapered inner end thereof, against which shoulder the shaft 168 bottoms to inhibit rightward movement thereof. The left end of the shaft 168 is rotatably mounted and extends through a bore 172 formed in the left wall of the housing 72. The housing 72 is formed with a counterbore 174 in the inner wall thereof surrounding the bore 172. The counterbore 174, as seen in FIG. 5, is made from opposed pie-shaped portions 176 and 178. A roll pin 190 is pressed in a radially extending opening 192 in the shaft 168 and abuts the axial end wall of the counterbore 174 to limit leftward movement of the shaft 168 and also, when it engages the circumferential limits of the pie-shaped counterbore, it limits rotational movement of the shaft 168.

The shaft 168 is provided with three axially spaced and chordally extending slots therein, 193, 194 and 196, one at the location of each of the pawls 144, 146 and 148, respectively. The slots are disposed angularly with respect to each other, for example, in this preferred embodiment with the parts of the relative size shown, and as viewed from the left in FIG. 2, a workable relationship is to have the slot 194 advanced approximately 32° counterclockwise from the slot 193, and the slot 196 advanced approximately 32° counterclockwise from the slot 194. When the slot 193 is horizontal, the roll pin 190 engages the side wall of the pie-shaped portion as shown in FIG. 5. When the slot 194 is disposed horizontally the roll pin 190 is disposed intermediate the side walls of the counterbore 174, and when the bottom of the slot 196 is disposed horizontally, the roll pin engages the opposite side walls of the counterbore 174 from that shown in engagement in FIG. 5. Accordingly, the side walls of the pie-shaped counterbore conveniently are at an included angle of 64° with respect to each other and thereby limit angular movement of the shaft 168 beyond that described.

A spring assembly 198 is provided for each of the pawls 144, 146 and 148, which includes a spring retainer 200 and a compression coil spring 202. The retainers 200 have a body portion 204 which is rectangular when viewed from the axial side thereof and closely fits in the bore 142 and have an axially extending opening therein which rotatably receives and closely fits the shaft 168, one retainer being to the left of each pawl so that a retainer spaces pawls 144 and 146 and spaces pawls 146 and 148; the location of the retainer with respect to the shaft is adjacent to the slot 193, 194 and 196.

The retainers 200 have a spring guide portion 206 extending radially outwardly from the body portion 204, the radially outer end thereof being bent 204 form an axially extending reaction flange 208 which overlies the pawl immediately to the right of the body portion 104 of the particular spring retainer, while the sides thereof are also bent, in the same axial direction as the flange 208, to form lateral spring-guides 210. One of the coil springs 202 is compressed between the radially outer end of each of the pawls 144, 146 and 148 and the reaction flange 208 overlying the same, thereby to constantly urge the pawls radially inwardly. When the slot 193 is disposed with its bottom horizontally the pawl 144 will be urged by its associated spring 202 to move radially inwardly into engagement with the periphery of the associated ring gear 82. When the shaft 168 is rotated to move the slot 194 to a horizontal position, the pawl 144 will be cammed radially outwardly and the pawl 146 will be moved radially inwardly by its associated spring until it engages the periphery of the associated ring gear 84 and when the slot 196 is disposed with its bottom horizontally the pawl 146 will be cammed radially outwardly and the pawl 148 will be urged by its associated spring to move radially inwardly until it engages the periphery of the associated ring gear 86. When the slot 156, 158 or 160 in the ring gear 82, 84 or 86, respectively, becomes aligned with the lug 150, 152 or 154, respectively, which has been moved inwardly, the particular lug will be moved into the aligned slot and lock the ring gear against rotational movement relative to the housing 72. When one of the pawls 144, 146 or 148 has been moved radially inwardly into its respective slot 193, 194 or 196, the other two pawls will be held outwardly by the engagement of the cylindrical surface of the shaft 168 which is angularly displaced from the slot associated with that pawl at such time.

When the pawls are displaced radially outwardly by the cylindrical portions of the shaft 168 the entire reactive load of the springs 202 are imposed upon the shaft 168, since the outer wall of the opening in the pawls is being pressed against the shaft as is the inner wall of the opening of the retainers 200, so that none of this load is being imposed upon the housing 34 nor is the shaft being biased relative to the housing by these springs.

Figure 13:
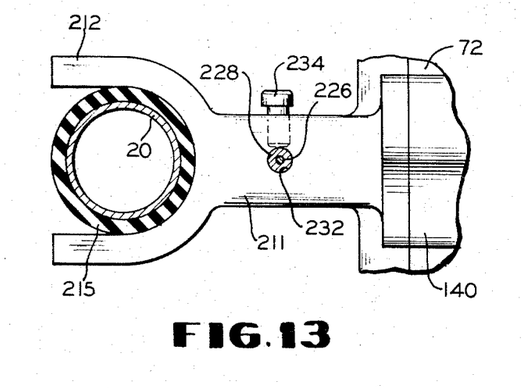
FIG. 13 is a fragmentary sectional view of the transmission and bicycle of FIGS. 1-7 taken along the lines 13—13 in FIG. 2.

Referring to FIGS. 2 and 13, means are provided to prevent rotation of the housing 72. More particularly, extending laterally to the left from the left side of the projecting portion 140 and toward the frame 16 is a boss 211 terminating in a bifurcated portion 212. The bifurcated portion is adapted to receive a suitable frame element, the particular one being received in the drawings is the forwardly extending lower frame element 20; however, the housing 72 can be indexed to place the boss 211 in other positions, such as with the bifurcation receiving the seat post element 18 or the rearwardly extending lower frame element 22, if desired. If the frame elements are directly joined to the housing the boss 211 is not necessary. A split elastomeric ring 215 is slipped onto the frame element 20 at its engagement by the bifurcated portion 212 to cushion shock engagement therebetween.

Shifting means is provided for rotating the shaft 168 and thereby shifting the transmission 34. The shaft 168 has a lever 220 suitably secured to the outboard end thereof as by a screw 222, which lever extends radially therefrom. The lever 220 has a projection 224 extending at a right angle adjacent its remote end, and the end of a control wire 226 of a cable control 228 passes through an opening in the projection 224 and is secured therein by a set screw 230. The cable control passes through an opening 232 in the boss 211 and is secured therein by a set screw 234, and then extends to a manually operable shifting mechanism shown generally at 236 in FIGS. 1 and 14.

Figure 14:
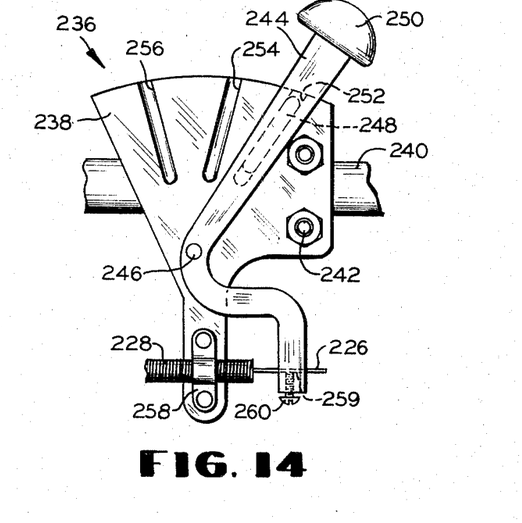
FIG. 14 is a schematic view of the hand operable shift lever for shifting the transmission of this invention among its various ratios.

The shifting mechanism 236, as seen in FIGS. 1, 2 and 14, includes a bracket 238 suitably secured to the bicycle frame 16, for example, to an upper horizontal frame element 240, as by a U-bolt 242. A dog-leg lever 244 is pivotally secured to the bracket intermediate its ends by a rivet 246 and has a detent 248 formed therein at a location intermediate the rivet and a handle 250 formed on the upper end thereof; which detent cooperates with three spaced indentations 252, 254 and 256 formed in the bracket 238. The upper end of the protective cover of the cable control 228 is secured to the bottom of the bracket 238 by a clamp 258 and the control wire 226 thereof extends into an opening 259 formed in the lower end of the lever 244 and is secured therein by a set screw 260. The position of lever 244 shown in FIG. 14, with the detent 248 engaging the indentation 252, corresponds to the first speed position. When the lever is moved counterclockwise to engage the detent 248 with the indentation 254 the lever and the shaft 168 are in the second speed position, while when the lever is moved further counterclockwise, the detent 248 will engage in indentation 256 and the lever and the shaft 168 will be in the third speed position.

While a three speed transmission has been shown and described, it is readily apparent that gear sets can be removed to reduce the number of ratios and, further, gear sets can be added to increase the number of ratios, accompanied with decreased and increased, respectively, numbers of pawls cooperating with notches in the shaft 168, and suitable adaptation of this shifting mechanism 236.

While no neutral condition has been specifically provided in the transmission 34, since the angular relationship of the slots 193, 194 and 196 are provided so that no two pawls 144, 146 and 148 can simultaneously be disposed full downwardly into engagements with their associated ring gear 82, 84 or 86, respectively, in the event that the manually operable shifting mechanism 236 is operated so that lever 244 is positioned intermediate a pair of adjacent indentations 252, 254 or 256, none of the pawls 144, 146 or 148 will be in engagement with a ring gear and the transmission 34 will be neutralized.

Absent the additional structure hereinafter described, while in the neutral condition, there would be no driving connection between the input shaft 42 and the sprocket 32 and there would be no way for an operator of the vehicle to drive the sprocket 32 in the reverse direction to apply the brakes in the wheel hub 26.

Additionally, when the pawl 144 is engaged with the ring gear 82, a maximum mechanical advantage for the transmission 34 exists between the input shaft 42 and the sprocket 32 which would give an operator maximum braking power. Less braking advantage exists when the pawl 146 is engaging the ring gear 84 and the least power available when pawl 148 engages ring gear 86. Accordingly, it would be a great advantage to downshift to underdrive (pawl 144 engaging ring gear 82) when braking is desired.

To insure a driving connection for reverse rotation of the sprocket 32 by the input shaft 42 at such times as the pawls 144, 146 and 148 are neutralized, and to give the additional benefit of downshifting to the highest ratio drive between the input shaft and sprocket, a reverse pawl 280 is provided to cooperate with the transmission shifting mechanism.

More particularly, the housing 72 is provided with an axially extending boss 282 adjacent to the projecting portion 140, which boss has a groove 284 formed therein which opens into the bore 74, and in the axial direction is approximately coextensive with the ring gear 82, terminating in a back wall 285. The front wall (not shown) is provided by the cover 73 of the housing 72. An axially extending slot 286 starts at the counterbore 284 and opens into the bore 142 in the projecting position 140 for the full axial length thereof.

As seen in FIG. 8, the reverse pawl 280 is generally "L" shaped having a base 288 and an arm 290 disposed at right angles thereto. The pawl 280 is positioned with the arm 290 disposed in the groove 284 overlying the periphery of ring gear 82 and the base 288 disposed in the slot 286, the inside edge 291 of the base 288 pivotally engaging the base 292 of the slot. The outside edge 294 of the base 288 is cooperatively disposed with respect to the notches 153 in the pawls 144, 146 and 148.

An opening 298 is formed in the boss 282, extending radially from the slot 286, and receives a compression spring 296 which is compressed between the base of the opening 298 and the top surface of the arm 290 of the reverse pawl 280, thereby to constantly bias the pawl to pivot counterclockwise about the pivotal engagement with the slot 286.

The pawl 280 has two operative positions; the first or disengaged position is shown in FIGS. 2 and 6, while the second or engaged position is shown in FIG. 6A. The reverse pawl 280 is moved between these two positions by the pawls 144, 146 and 148.

More particularly, when one of the pawls 144, 146 or 148 is in its downward position, with the lug 150, 152 or 154, respectively, thereof engaged with the slot 156, 158 or 160, respectively, of ring gear 82, 84 or 86, respectively, as seen in FIG. 6 with respect to pawl 144, the upper wall 155 of the notch 153 therein presses down upon the top of the outside edge 294 of the base 288 of the reverse pawl 280 thereby pivoting the reverse pawl 280 clockwise about the pivotal engagement with the slot 286 to its first or disengaged position, accompanied by compression of the spring 296. It should be noted that, when the pawl 144 is down as seen in FIG. 6, the pawl 148, as seen in FIG. 7, is in its upward position and the shoulder 155 of the notch 153 therein is spaced upwardly from the outside edge 294 of the reverse pawl 280.

When none of the pawls 144, 146 or 148 are in the downward position, the shoulders 155 of the notches 153 therein will be upwardly sifficient for the spring 296 to bias the reverse pawl 280 counterclockwise to its second or engaged position as seen in FIG. 6A.

When the transmission 34 is operated in its forward or driving mode, the ring gear 82, as well as ring gears 84 and 86, will attempt to rotate counterclockwise in the direction of the arrow F with the lug 150, 152 or 154 of the pawl 144, 146 or 148 which is engaged with the notch 156, 158 or 160, respectively, preventing such counterclockwise rotation. When the transmission is operating in its reverse or braking mode, the ring gears 82, 84 and 86 attempt to rotate clockwise in the direction of the arrow R.

When all of the pawls 144, 146 and 148 are disposed upwardly from their engaged position, for example, in neutral because the lever 244 is positioned intermediate a pair of adjacent slots 252, 254 or 256, the reverse pawl 280 will move to its second or engaged position and upon operation of the transmission in its reverse mode, the outer end 300 of the arm 290 will enter and engage one of the notches 156 in the ring gear 82, thereby to prevent reverse rotation of the ring gear 82 and allowing the input shaft 42 to be drivingly connected to the sprocket 32 for reverse or braking movement of the latter.

Additionally, if any one of the pawls 144, 146 or 148 are engaged with the notch of its associated ring gear, upon reverse operation of the transmission, and with reference to pawl 144 in FIGS. 6 and 6A for explanation purposes, the ring gear 82 will attempt to move clockwise so that the left side of the notch 156 will cooperate with the cam surface 151 on the left side of the lug 150 biasing the pawl radially outwardly against the spring 202 effectively moving the pawl 144 to its neutral position. All the pawls 144, 146 and 148 will now be positioned upwardly so that the reverse pawl 280 will move counterclockwise and engage one of the notches 156 in the ring gear 82. It should be noted that this operation will happen even if the pawl 146 or 148 was engaging its associated ring gear so that no matter which of the pawls 144, 146 or 148 was engaged with a ring gear, upon reverse operation of the transmission, the engaging pawl 144, 146 or 148 will be cammed upwardly and the reverse pawl 280 will move to its engaged position. When the reverse pawl 280 is in its engaged position and the transmission operated in reverse, the reaction between the pawl 280 and the notch 156 in ring gear 82 will hold the pawl in this position so that the reverse pawl 280 will hold the pawl 144 as seen in FIG. 6A (or the pawl 146 or 148 if one of these pawls are being biased against that spring 202).

When operation in reverse mode is discontinued and forward mode operation commences, ring gear 82 may move counterclockwise relative to reverse pawl 280 and the right side of notch 156 engages the right side of the reverse pawl thereby camming the same upwardly. If a particular cam 144, 146 or 148 has been selected by the shift mechanism, the spring 202 now biases the selected pawl downwardly and the same will engage in a notch 156, 158 or 160, respectively. Such movement of the selected pawl downwardly cooperates with the camming by notch 156 in moving the reverse pawl 280 counterclockwise.

Figure 10:
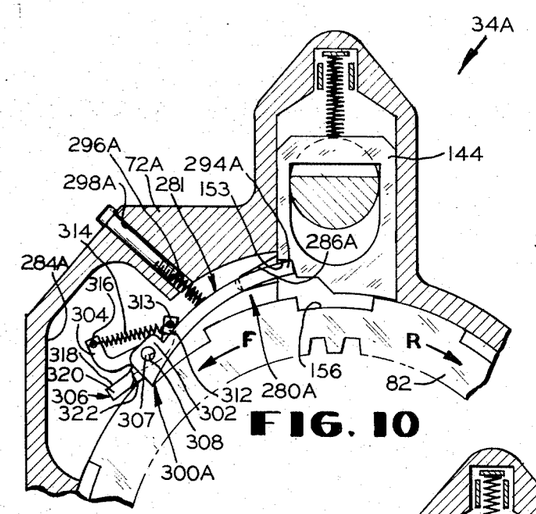
Figure 11:
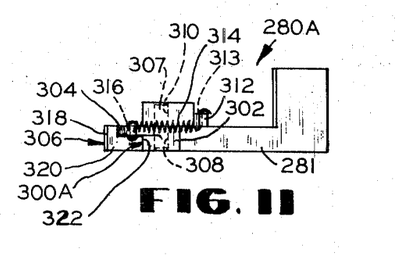
FIG. 11 is a plan view of the reverse pawl seen in FIGS. 9 and 10.

Referring now to FIGS. 9-11, a modification of the reverse pawl is shown at 280A, all other parts of the transmission shown at 34A being substantially the same as the transmission 34 except for minor modifications in the slot 284A from the slot 284 and the housing 72 of the embodiment in FIGS. 1-8. In this embodiment the primary portion 281 of the reverse pawl 280A is "L" shaped and cooperates with the pawls 144, 146 and 148 exactly the same as the reverse pawl 280 of the first embodiment. Additionally, the reverse pawl 280A except for the left end thereof is shaped the same as the pawl 280. As seen in FIGS. 9 and 10, the left end 300A of the primary portion 281 of the pawl 280A has an enlarged radially outwardly extending boss 302 formed therein, and extending leftwardly and upwardly from the boss is a dog-legged shaped spring engaging portion 304 formed integrally with the boss 302. A secondary reverse pawl 306 is pivotally secured to the boss 302 by means of a pivot pin 307 pressed in an opening 308 in the boss 302 and pivotally received in an opening 310 formed in the secondary pawl 306 at a point intermediate its ends. The secondary pawl 306 at its medial portion as seen in FIGS. 9–10, is disposed behind the boss 302. The right end 312 of the secondary pawl 306 curves gently upwardly to the right and has an opening 313 therein which securely receives the right end of a tension spring 314; the other end of the spring being securely received in an opening 316 in the outer end of the spring engaging portion 304 whereby the secondary pawl 306 is biased by spring 314 to move counterclockwise relative to the primary portion 281 of the pawl 280A.

The left end 318 of the secondary pawl 306 projects beyond the end 300A of the primary portion 281 and has a boss 320 formed therein, (which as viewed in FIGS. 9 and 10 projects in a direction out of the drawing) which is aligned with the primary portion 281. A shoulder 322 in the right side of the boss 320 engages the outer end of the primary portion 281 when the spring 314 has pivoted the secondary pawl 306 counterclockwise, to prevent further counterclockwise movement thereof.

In FIG. 9, the pawl 280A is shown in its first or disengaged position with the shoulder 153 on pawl 144 engaging the outer edge 294A of the pawl 280 maintaining the latter pivoted clockwise. The spring 314 maintains the secondary pawl 306 pivoted counterclockwise with left end 318 thereof aligned with the primary portion 281. In FIG. 10, the reverse pawl 280A is shown in its second or engaged position; a spring 296A received in an opening 298A in the housing 72A and compressed against the top of primary portion 281 having urged the pawl 280 counterclockwise from its disengaged position. The reverse pawl 280A actually has two engaged positions as hereinafter explained.

When the pawl 144 moves upwardly, either because the transmission is neutralized and/or being operated in its reverse mode, the reverse pawl 280A will be pivoted counterclockwise by the spring 296. If the secondary reverse pawl 306 enters a notch 156, it will engage the left end of the notch and prevent clockwise rotation of the ring gear 82. However, if the secondary reverse pawl engages the periphery of the ring gear at a location intermediate two adjacent notches 156, the secondary pawl 306 will be pivoted clockwise relative to the primary portion 281 of the reverse pawl 280A thereby allowing the left end 300A of the primary portion 281 to engage the notch 156 which will be adjacent thereto. The purpose for the secondary pawl 306 is to insure that the reverse pawl 280A engages in a notch 156 without allowing excessive clockwise movement of the ring gear 82 at the commencement of reverse mode operation, so that if the transmission is being used with a bicycle, the pedals will not require excessive reverse rotation to engage the brakes.

Figure 12:
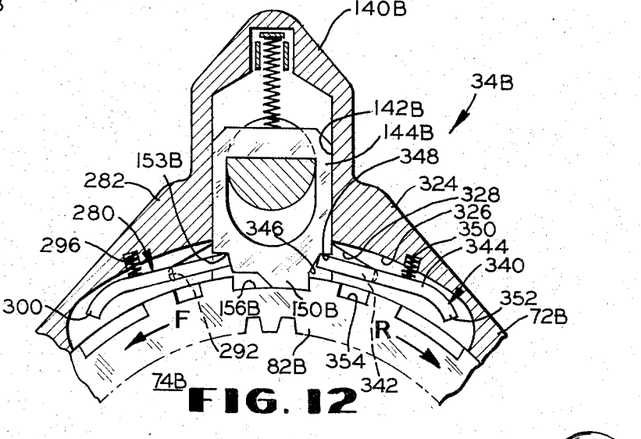
FIG. 12 is a view taken similarly to FIG. 6 of a third embodiment of this invention.

Referring now to FIG. 12 wherein another embodiment of this invention is shown, the transmission 34B is substantially the same as the transmission 34 of FIGS. 1–8 with the addition of a forward pawl, slight modifications in the pawls 144, 146 and 148 and slight modifications in the housing and in the periphery of the ring gear 82B.

A reverse pawl 280 is provided for engaging the ring gear 82B at such times as the shifting pawls 144B, 146B and 148B (pawls 146B and 148B not shown) are disposed upwardly and/or the transmission 34B are operated in its reverse mode; the reverse pawl cooperating with notches 153B on the left side of the shifting pawls.

The housing 72B is provided with a second boss 324 on the opposite side of the projection 140B from the boss 282. A groove 326 is formed in the boss 282 and opens to the bore 74B in the housing and overlies the periphery of the underdrive ring gear 82B. A notch 328 commences from the back wall of the groove 326 and opens to the bore 142B in the projection 140B.

A forward pawl 340, which is a mirror image of the pawl 280, has a base 342 and an arm 344, with the arm overlying the ring gear 82B and the base being pivotally disposed in the notch 328 and cooperable with notches 346 formed in the right side of pawls 144B, 146B and 148B. Referring to the pawl 144B, the notch 346 has an upper wall 348 engageable with the upper surface of the inner edge of the base 342 of the pawl 340. When any one of the pawls 144B, 146B or 148B is in its downward position, as shown in FIG. 12 re pawl 144B, the upper wall 348 of the notch 346 therein will engage the pawl 340 and pivot the same counterclockwise to its disengaged position. When all of the pawls 144B, 146B and 148B are in their neutral or up position, a compression spring 350, carried by the housing 72B and engaging the upper surface of the pawl 340, urges the pawl to pivot clockwise, so that the outer end 352 thereof moves toward the periphery of the ring gear 82B.

The ring gear 82B not only has a plurality of notches 156B, like the notches 156 or FIGS. 1–11, but also has a plurality of intermediate notches 354, with a notch 354 disposed intermediate each notch 156B. While the lug 150B of the pawl 144B can enter the notches 156B, it is too wide to enter the intermediate notches 354. In this embodiment, whenever the outer end 352 of forward pawl 340 or outer end 300 of reverse pawl 280 moves to engage the ring gear 82B, it may engage either the one of the notches 156B or notches 354, which first registers therewith. The purpose of the intermediate notches 354 is to enable engagement of the ring gear 82B other than at the notches 156B, so that a secondary pawl, like reverse pawl 306 of FIGS. 9–11 is not needed to prevent excessive movement of the ring gear 82B before the reverse or forward pawl engages a notch in the ring gear.

The outer end 352 of pawl 340 will only enter and engage a notch 156B or 354 when the ring gear is rotating in the direction of the arrow F, i.e., the forward mode of transmission operation. Thus, in upshifting from first to second, or second to third or downshifting from third to second or second to first, if neutral is accidentally selected, the pawl 340, upon forward rotation of ring gear 82B, will engage the ring gear 82B for forward mode operation in first gear to insure a driving relationship of the input shaft 42 to sprocket 32. When the operator realizes the neutral condition of the shift lever 244 and moves the latter to the first, second or third speed position, the forward pawl 340 will remain engaged with the first speed ring gear 82B until the forward drive of this ring gear is momentarily released, at which time the pawl 340 will be pivoted counterclockwise by the particular pawl 144B, 146B, 148B which has been selected, moves downwardly.

It should be understood that while the reverse pawls and forward pawl have been shown as engaging the first speed ring gear, it is contemplated that, for example, the outer end 300 of the reverse pawl or the outer end 352 of the forward pawl could be positioned to engage a ring gear other than the second or third speed ring gear, less mechanical advantage will exist between the input shaft 42 and the sprocket 32 for braking purposes.

Having described preferred embodiments of this invention, what is claimed is:

1. A transmission comprising in combination:
   a. input and output means for said transmission with said input means being adapted for rotation in both a forward and reverse direction for driving said output shaft in a forward and reverse direction, respectively,
   b. at least a pair of selectable power paths for drivingly connecting said input and output means,
   c. selectably operable control means for selecting the desired one of said power paths and having a neutral condition wherein neither of said power paths is selected,
   d. and reverse means automatically operable when said control means is in its neutral condition and upon reverse rotation of said input means for drivingly connecting one of said power paths between said input and output means.

2. A transmission according to claim 1 including a housing adapted to be mounted against rotation and wherein,
   a. said input and output means are shafts rotatably mounted in and projecting from said housing,
   b. said power paths comprising a first and a second gear train disposed in said housing,
   c. said control means includes an actuating means which has a first position wherein it connects said first gear train in a driving relationship between said input and output shafts while disconnecting said second gear train, a second position wherein it connects said second gear train in a driving relationship between said input and output shaft while disconnecting said first gear train and a third position wherein it disconnects both of said gear trains from a driving relationship, and said reverse means, upon reverse rotation of said input means and at such times as said actuating means is in its third position, drivingly connects one of said gear trains between said input and output shafts.

3. A transmission according to claim 1 including a housing adapted to be mounted against rotation and wherein,
   a. said input and output means are shafts rotatably mounted in and projecting from said housing,
   b. said power paths comprise a first and a second planetary gear set disposed in said housing with each set including a ring gear, a sun gear, and planetary gearing,
   c. said sun gear of each gear set is drivingly connected to one of said shafts and the planetary gearing of each gear set is drivingly connected to the other of said shafts,
   d. said control means includes means carried by said housing for arresting the rotation of the ring gear of the selected planetary gear set for connecting the input and output shafts for forward drive through the selected gear set,
   e. said reverse means includes means carried by said housing for arresting rotation of one of said ring gears solely at such times as said input shaft rotates in the reverse direction.

4. A transmission according to claim 3 wherein,
   a. each of said ring gears includes detent means therein,
   b. said arrest means includes a separate shifter pawl associated with each of said ring gears,
   c. each of said shifter pawls has a disengaged position wherein it is spaced from its associated ring gear and an engaged position wherein it engages the detent means of its associated ring gear,
   d. said control means includes an actuating means which has a first position wherein it moves one of said shifter pawls to its engaged position while retaining the other of said pawls in its disengaged position, a second position wherein it moves said one pawl to its disengaged position and moves said other pawl to its engaged position and a third position wherein it maintains both of said pawls in their disengaged position.

5. A transmission according to claim 4 wherein said reverse means is a reverse pawl engageable with the detent means of one of said ring gears.

6. A transmission according to claim 5 wherein,
   a. the ring gear engaged by its associated shifter pawls is urged in a first or forward direction upon forward rotation of said input shaft and is urged to rotate in a second or reverse direction of rotation upon reverse rotation of said input shaft,
   b. each of said ring gears and the shifter pawl associated therewith includes disengaging means for moving said shifter pawl from its engaged position to its disengaged position upon reverse rotation of said ring gear whereby, if said actuating means is in its first or second position, upon reverse rotation of said input shaft the one of said shifter pawls engaged with its associated ring gear will be moved to its disengaged position.

7. A transmission according to claim 5 wherein said reverse pawl has a disengaged position wherein it is spaced from said one ring gear and an engaged position wherein it engages the detent means of said one ring gear, means bias said reverse pawl to its engaged position, and means interconnect said shifter pawls and said reverse pawl for moving the latter to its disengaged position when any of said shifter pawls is in its engaged position and allowing said biasing means to bias said reverse pawl to its engagement position upon movement of all said shifter pawls to their disengaged position.

8. A transmission according to claim 7 wherein said detent means is a plurality of notches in the periphery of said ring gears, said shifter pawls are engageable in the notches of the ring gear associated therewith, and said reverse pawl is engageable in the notches of said one ring gear.

9. A transmission according to claim 7 wherein said interconnecting means is a first shoulder formed on each of said shifter pawls and a corresponding second shoulder formed on said reverse pawl with said first shoulders being engageable with said second shoulder for urging said reverse pawl to its disengaged position upon movement of any of said shifter pawls to its engaged position.

10. A transmission comprising in combination, a. input and output means for said transmission with said input means being adapted for rotation in both a forward and a reverse direction for driving said output shaft in a forward and a reverse direction, respectively, b. at least a pair of selectable power paths for drivingly connecting said input and output means, c. selectably operable control means for selecting one or the other of said power paths, d. and reverse means automatically operable upon reverse rotation of said input shaft for drivingly connecting said one of said power paths between said input and output means for driving said output means in a reverse direction regardless of which one of said power paths have been selected by said control means.

11. A transmission according to claim 10 wherein said control means includes means rendering the same inoperative upon reverse rotation of said input means and returning said control means to an operative condition upon discontinuance of reverse rotation of said input means.

12. A transmission according to claim 10 wherein,
a. said power paths are a first and a second gear train,
b. said control means is selectably oeprable to connect one of said gear trains in a driving relationship between said input and output means, and
c. said control means includes means for discontinuing its connection of the selected one of said gear trains in a driving relationship between said input and output means upon reverse rotation of said input means.

13. A transmission according to claim 10 including a housing adapted to be mounted against rotation and wherein,
a. said input and output means are shafts rotatably mounted in and projecting from said housing,
b. said power paths comprised a first and a second planetary gear set disposed in said housing with each set including a ring gear, a sun gear, and planetary gearing,
c. said sun gear of each gear set being drivingly connected to one of said shafts and the planetary gearing of each gear set being drivingly connected to the other of said shafts,
d. said control means includes means carried by said housing for arresting the rotation of the ring gear of the selected planetary gear set for connecting the input and output shafts for forward drive through the selected gear set,
e. said reverse means includes means carried by said housing for arresting rotation of one of said ring gears solely at such times as said input shaft rotates in the reverse direction.

14. A transmission according to claim 13 wherein,
a. each of said ring gears includes detent means therein,
b. said arresting means includes a separate shifter pawl associated with each of said ring gears,
c. each of said shifter pawls has a disengaged position wherein it is spaced from its associated ring gear and an engaged position wherein it engages the detent means of its associated ring gear,
d. said control means includes actuating means which, upon operation of said control means, moves a selected one of said shifter pawls into engagement with the detent means of the ring gear associated with the selected pawl,
e. said reverse means is a reverse pawl engageable with the detent means of one of said ring gears.

15. A transmission according to claim 14 wherein,
a. the ring gear engaged by the selected one of said shifter pawls is urged in a first or forward direction upon forward rotation of said input shaft and is urged to rotate in a second or reverse direction of rotation upon reverse rotation of said input shaft,
b. each of said ring gears and the shifter pawl associated therewith include disengaging means for moving said shifter pawl from its engaged position to its disengaged position upon reverse rotation of said ring gear,
c. whereby upon reverse rotation of said input shaft the one of said shifter pawls engaged with its associated ring gear is moved to its disengaged position.

16. A transmission according to claim 15 wherein said reverse pawl has a disengaged position wherein it is spaced from said one ring gear and an engaged position wherein it engages the detent means of said one ring gear, means bias said reverse pawl to its engaged position, and means interconnect said shifter pawls and said reverse pawl for moving the latter to its disengaged position when any of said shifter pawls is in its engaged position and allowing said biasing means to bias said reverse pawl to its engagement position upon movement of all said shifter pawls to their disengaged position.

17. A transmission according to claim 16 wherein said detent means is a plurality of notches in the periphery of said ring gears, said shifter pawls are engageable in the notches of the ring gear associated therewith, and said reverse pawl is engageable in the notches of said one ring gear.

18. A transmission according to claim 17 wherein said disengaging means is a cam surface disposed on each of said shifter pawls, said cam surface being disposed to cooperate with the detents of the ring gear associated with said shifter pawl when said ring gear is rotated in its reverse direction.

19. A transmission according to claim 16 wherein said interconnecting means is a first shoulder formed on each of said shifter pawls and a corresponding second shoulder formed on said reverse pawl with said first shoulders being engageable with said second shoulder for urging said reverse pawl to its disengaged position upon movement of any of said shifter pawls to its engaged position.

20. A transmission according to claim 18 wherein said interconnecting means is a first shoulder formed on each of said shifter pawls and a corresponding second shoulder formed on said reverse pawl with said first shoulders being engageable with said second shoulder for urging said reverse pawl to its disengaged position upon movement of any of said shifter pawls to its engaged position.

21. A transmission according to claim 17 wherein said notches engageable by said shifter pawls are first notches, said one ring gear has a plurality of reverse notches in the periphery thereof disposed intermediate the first notches in said one ring gear, said reverse notches are smaller than said first notches and smaller than the portion of said shifter pawl engageable with said first notches of said one ring gear whereby said shifter pawl is not engageable with said reverse notches, and the portion of said reverse pawl engageable with the notches of said one ring gear is dimensioned so as to be engageable with said reverse notches and thereby engageable with all the notches of said one ring gear.

22. A transmission according to claim 17 wherein said reverse pawl has inner and outer portions pivotally connected to each other, said inner and outer portions each have an engaging portion thereon adapted to engaged notches of said one ring gear, spring means act between said inner and outer portion for biasing said outer portion to a position whereby the engaging portion of said outer portion will first engage said ring gear upon movement of said reverse pawl toward its engaged position, said spring means allowing pivotal movement of said outer portion relative to said inner portion in a direction away from said one ring gear upon the outer portion engaging a location on the periphery of said one ring gear intermediate the notches therein, whereupon the engaging portion of said inner portion may enter a notch in the periphery of said one ring gear.

23. A transmission according to claim 10 wherein said selectably operable control means has a neutral condition wherein neither of said power paths is selected and said transmission includes forward means automatically operable when said control means is in its neutral condition and upon forward rotation of said input means for drivingly connecting one of said power paths between said input and output means.

24. A transmission according to claim 1 including forward means automatically operable when said control means is in its neutral condition and upon forward rotation of said input means for drivingly connecting one of said power paths between said input and output means.

25. A transmission having a housing and being adapted for use with a bicycle having a wheel with a coaster brake hub therein driven by a wheel sprocket, which hub provides a braking action on the wheel upon reverse rotation of the sprocket and with the wheel sprocket adapted for chain drive from a driving sprocket, said transmission being adapted to be carried by the bicycle frame with the transmission housing mounted to the frame against rotation relative thereto, said transmission comprising an input shaft rotatably mounted in said housing and projecting from opposed sides thereof with the axis of said shaft disposed so as to be transverse with respect to the longitudinal axis of the bicycle, said shaft being adapted to be rotated in both a forward and reverse direction by an operator of the bicycle, an output shaft co-axial with said input shaft and rotatably mounted thereon, with one end of said output shaft projecting from said housing an amount less than the projection of said input shaft and adapted for driving connection to a driving sprocket, at least a first and a second gear train disposed in said housing for drivingly connecting said input shaft to said output shaft, manually operable control means for alternately connecting said gear trains in a driving relationship between said shafts, and means automatically actuated upon reverse rotation of said input shaft for drivingly connecting said input shaft to said output shaft.

26. A transmission according to claim 25 wherein said control means has a neutral condition wherein it does not connect either of said gear trains in a driving relationship with said shafts, and said automatic means is actuated by said control means entering such neutral condition.

27. A transmission according to claim 26 wherein said control means includes means for neutralizing said control means upon reverse rotation of said input shaft.

28. A transmission according to claim 26 including forward actuating means automatically actuated upon forward rotation of said input shafts and only at such times as said control means is in its neutral condition for drivingly connecting one of said gear trains in a driving relationship between said shafts.

* * * * *